US008588054B2

(12) United States Patent  (10) Patent No.: US 8,588,054 B2
Khandekar et al.  (45) Date of Patent: Nov. 19, 2013

(54) SILENCE INTERVALS IN WIRELESS COMMUNICATIONS

(75) Inventors: Aamod Khandekar, San Diego, CA (US); Alexei Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 11/924,351

(22) Filed: Oct. 25, 2007

(65) Prior Publication Data

US 2008/0130483 A1 Jun. 5, 2008

Related U.S. Application Data

(60) Provisional application No. 60/863,131, filed on Oct. 26, 2006.

(51) Int. Cl.
*H04J 11/00* (2006.01)

(52) U.S. Cl.
USPC .......... 370/208; 370/252; 370/259; 370/350; 370/477; 455/67.11; 455/69; 455/423

(58) Field of Classification Search
None
See application file for complete search history.

(56) References Cited

U.S. PATENT DOCUMENTS

| | | | | |
|---|---|---|---|---|
| 5,191,576 A * | 3/1993 | Pommier et al. | | 370/312 |
| 7,020,165 B2 * | 3/2006 | Rakib et al. | | 370/485 |
| 7,024,188 B2 | 4/2006 | Khun-Jush et al. | | 455/423 |
| 7,103,371 B1 * | 9/2006 | Liu | | 455/456.4 |
| 7,230,909 B1 * | 6/2007 | Raissinia et al. | | 370/206 |
| 7,522,919 B2 * | 4/2009 | Yoon et al. | | 455/428 |
| 7,702,289 B2 * | 4/2010 | Tzavidas et al. | | 455/69 |
| 2002/0054586 A1 * | 5/2002 | Hoffmann | | 370/352 |
| 2005/0013283 A1 | 1/2005 | Yoon et al. | | 370/350 |
| 2005/0031058 A1 * | 2/2005 | Soong et al. | | 375/345 |
| 2005/0099988 A1 | 5/2005 | Wang et al. | | 370/343 |
| 2005/0154583 A1 * | 7/2005 | Naka et al. | | 704/217 |
| 2005/0254555 A1 | 11/2005 | Teague et al. | | |
| 2006/0029011 A1 * | 2/2006 | Etemad et al. | | 370/311 |
| 2007/0238482 A1 * | 10/2007 | Rayzman et al. | | 455/552.1 |
| 2007/0270100 A1 | 11/2007 | Agrawal et al. | | 455/67.11 |
| 2007/0274338 A1 * | 11/2007 | Sebire et al. | | 370/466 |
| 2008/0198774 A1 * | 8/2008 | Li | | 370/280 |
| 2008/0205350 A1 * | 8/2008 | Sim | | 370/336 |
| 2009/0141697 A1 * | 6/2009 | Hofmann | | 370/345 |

FOREIGN PATENT DOCUMENTS

| | | |
|---|---|---|
| GB | 2401289 A | 11/2004 |
| JP | 2006529075 A | 12/2006 |

(Continued)

OTHER PUBLICATIONS

International Search Report, PCT/US07/082738, International Search Authority, European Patent Office, Apr. 8, 2008.

(Continued)

*Primary Examiner* — Chi Pham
*Assistant Examiner* — Shick Hom
(74) *Attorney, Agent, or Firm* — Howard Seo

(57) ABSTRACT

Systems and methodologies are described that facilitate silence interval specification and utilization in wireless communications. In particular, a silence interval can be defined such that communications cease during the interval, defined by an interval period, offset within the interval period, and duration; the communication can be that of mobile devices to base stations in a wireless communication network. In this regard, base stations can measure thermal noise during the silence to set a interference over thermal (IoT) level in one example. Additionally, other systems and networks can use the silence intervals to transmit, such as public safety devices and/or peer-to-peer communication. The wireless mobile devices can receive the silence interval information and appropriately blank out communications during the defined period.

50 Claims, 11 Drawing Sheets

(56) References Cited

FOREIGN PATENT DOCUMENTS

| JP | 2007500489 A | 1/2007 |
| RU | 2186465 C2 | 7/2002 |
| WO | WO2005011163 A1 | 2/2005 |
| WO | 2006007318 | 1/2006 |

OTHER PUBLICATIONS

Written Opinion, PCT/US07/082738, International Search Authority, European Patent Office, Apr. 8, 2008.
Taiwan Search Report—TW096140478—TIPO—Mar. 21, 2012.

* cited by examiner

SILENCE INTERVALS IN WIRELESS COMMUNICATIONS

CROSS-REFERENCE TO RELATED APPLICATIONS

This application claims the benefit of U.S. Provisional Patent application Ser. No. 60/863,131 entitled "A METHOD AND APPARATUS FOR SILENCE INTERVAL IN A WIRELESS COMMUNICATION SYSTEM" which was filed Oct. 26, 2006. The entirety of the aforementioned application is herein incorporated by reference.

BACKGROUND

I. Field

The following description relates generally to wireless communications, and more particularly to defining silence intervals in a wireless communications system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g. bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In such systems, base stations, or other access points, can send out broadcast signals consumable by a plurality of mobile devices (e.g., cellular phones and the like) to provide information regarding presence of the base station and other information related thereto. For example, the information can comprise protocol for initiating communication with the base station. Base stations can be provided for multiple carriers, for instance, each of which can send broadcast signals over a forward link to the plurality of mobile devices in a MIMO configuration. The broadcast signals can be sent on similar channels using contiguous or adjacent frequencies. The base stations can also receive communications from the mobile devices on a reverse link, which can cause interference between the devices and/or base stations. However, some level of interference can be desired to allow the devices to transmit with sufficient power.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating defining and utilizing a silence interval in connection with wireless communications systems to allow thermal measurement of a base station uplink, peer-to-peer communication, public safety device transmissions, and/or the like. The silence interval can be defined by the base station and sent to the mobile devices in one example; additionally, however, the silence interval can be pre-coded in the various devices, determined from inferences, determined based on other information, etc.

According to related aspects, a method that facilitates defining a silence interval in a wireless communications network is described herein. The method can comprise determining a silence interval comprising an interval period, an offset within the period, and a duration for silencing one or more transmitting devices. The method can further comprise measuring an uplink thermal noise level during the silence interval.

Another aspect relates to a wireless communications apparatus. The wireless communications apparatus can include at least one processor configured to define a silence interval as a portion of one or more OFDM symbol periods of transmission bandwidth such that devices cease transmission during the silence interval. The wireless communications apparatus can also include a memory coupled to the at least one processor.

Yet another aspect relates to a wireless communications apparatus that facilitates defining one or more silence intervals. The wireless communications apparatus can comprise means for creating a silence interval based on one or more portions of one or more OFDM symbol periods. Moreover, the wireless communications apparatus can further include means for transmitting information regarding the silence interval to one or more mobile devices such that the mobile devices can cease communications during the silence interval.

Still another aspect relates to a computer program product, which can have a computer-readable medium including code for causing at least one computer to determine a silence interval comprising one or more OFDM symbol periods during which one or more transmitting devices can cease communications. Moreover, the code can additionally cause the at least one computer to perform a task during the silence interval.

In accordance with another aspect, an apparatus in a wireless communication system can include a processor configured to create a silence interval based on one or more portions of one or more OFDM symbol periods and transmit information regarding the silence interval to one or more mobile devices such that the mobile devices can cease communications during the silence interval. Also, the apparatus can include a memory coupled to the processor.

According to a further aspect, a method that facilitates silencing communications during a silence interval is described herein. The method can comprise obtaining silence interval metrics including an interval period of a superframe, an offset within the superframe, and a duration. The method can further comprise blanking out relevant subbands of one or more physical (PHY) transmission frames that are a part of the silence interval.

Another aspect relates to a wireless communications apparatus. The wireless communications apparatus can include at least one processor configured to receive a silence interval definition comprising an OFDM interval period for silence and for silence communications during the silence interval. The wireless communications apparatus can also include a memory coupled to the at least one processor.

Yet another aspect relates to a wireless communication apparatus for effectuating silence during a silence interval. The wireless communications apparatus can include means for receiving a silence interval definition as well as means for detecting the beginning of the silence interval based on an OFDM interval period and an offset within the period. The wireless communications apparatus can also include means for ceasing communications at the beginning of the silence interval for a specified duration.

Still another aspect relates to a computer program product, which can have a computer-readable medium including code for causing at least one computer to obtain silence interval metrics related to one or more portions of one or more OFDM symbol periods. The code can also cause the at least one computer to silence transmission during the silence interval.

In accordance with another aspect, an apparatus can be provided in a wireless communication system including a processor configured to receive a silence interval definition, detect the beginning of the silence interval based on an OFDM interval period and an offset within the period, and cease communications at the beginning of the silence interval for a specified duration. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
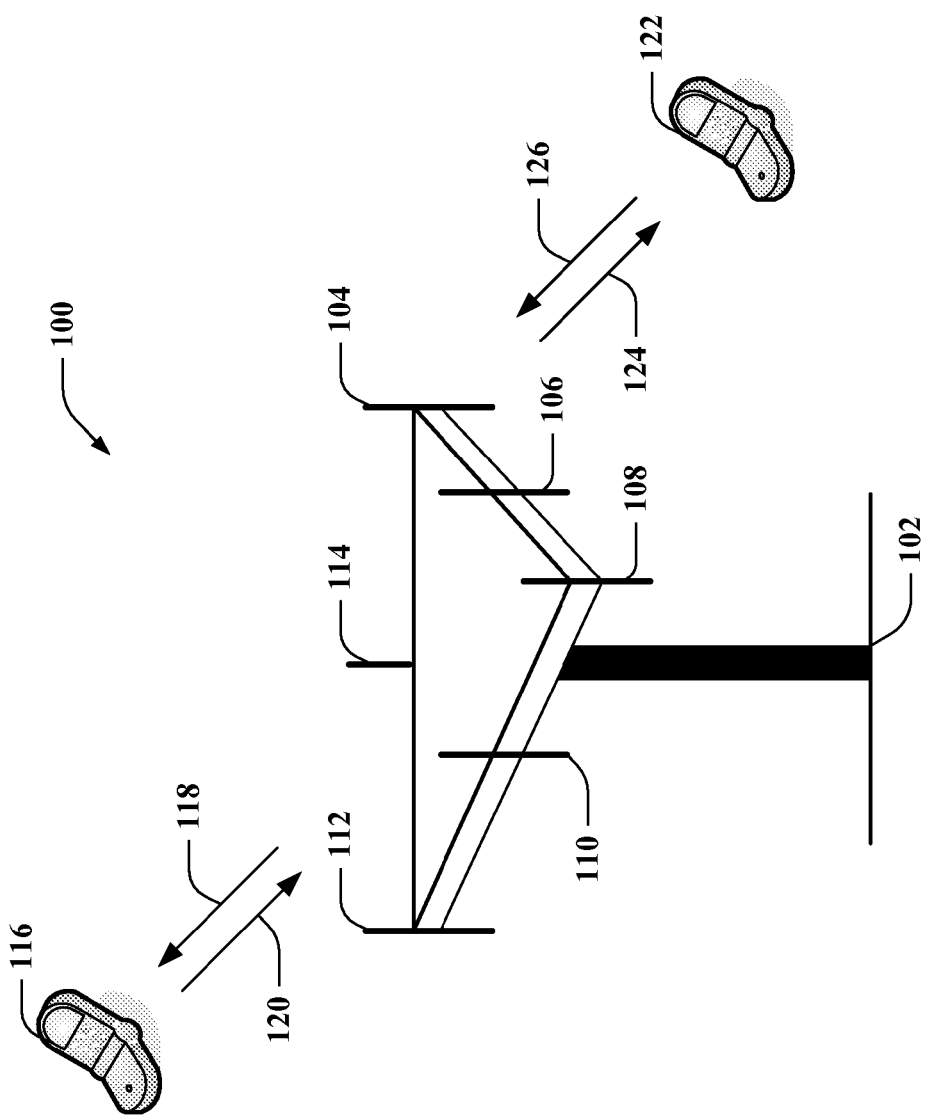
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

According to an example, system 100 can be a multiple-input multiple-output (MIMO) communication system. Further, system 100 can utilize substantially any type of duplexing technique to divide communication channels (e.g. forward link, reverse link, . . . ) such as FDD, TDD, and the like. In one example, one or more silence intervals can exist during communication within a network comprising the base station 102 and mobile devices 116 and 122. During the silence interval, the mobile devices 116 and 122 can cease signal transmission throughout the interval allowing the base station 102 to measure its thermal noise level. Based on this information, the base station 102 can define or modify its interference over thermal (IoT) level to maximize throughput with respect to a level of interference based on the thermal noise level. For example, more interference can allow higher transmit powers, and thus, better communication quality and efficiency. However, if interference increases to a level that impedes the base station 102 from interpreting communication from the devices, the increase in interference can outweigh the benefit. Thus, it is desirable for the base station 102 to keep an optimal IoT ratio or level for its environment. It is to be appreciated that this can be implemented in a synchronous configuration such that the synchronized devices can stop transmitting at the time period with high precision and consistency.

In one example, the base station 102 can inform the mobile devices 116 and 122 about the silence interval and the metrics necessary to participate (e.g., superframes comprising the silence intervals, offsets within the superframes for beginning silence, and/or a duration therefor). Additionally or alternatively, the mobile devices 116 and 122 can be preconfigured with this information. Furthermore, the silence intervals can be used, in one example, for communications related to other networks or systems. For example, one or more silence intervals can be reserved for public safety systems such to allow public safety devices to transmit high energy with minimal interference during the silence intervals for other devices in the communication system 100. In this regard, the public safety devices can reliably transmit critical information, and can do so from further distance or in areas of lower signal. The silence intervals can also be used for peer-to-peer (e.g., mobile device 116 to mobile device 122) communications as well, in one example. In this way, the mobile devices 116 and 122 can communicate without interrupting signals between the base station 102 and other devices, for example.

Figure 2:
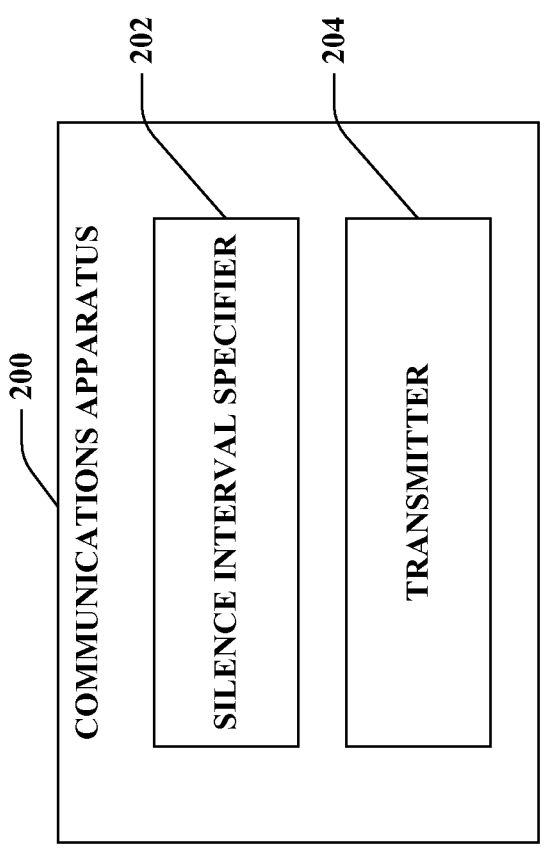
FIG. 2 is an illustration of an example communications apparatus for employment within a wireless communications environment.

Turning to FIG. 2, a communications apparatus 200 for a wireless communications environment is illustrated. Communications apparatus 200 can be a base station, mobile device or a portion thereof, for example. Communications apparatus 200 can comprise a silence interval specifier 202 that determines and/or communicates a point of time in which uplink or cross-device communication in a wireless mobile network can be silenced and a transmitter 204 that can send or broadcast communications on a forward or reverse link, for example. In one example, the silence interval specifier 202 can determine a silence interval defined by a period of time during which the silence interval is to begin, an offset within the time period related to the point in the period of time for the start of the silence interval, and a duration of time for the silence interval to continue; the transmitter 204 can cease communication during the silence interval. In one example, the period of time can refer to a periodicity of the silence interval, meaning the duration between consecutive silence intervals. This can be, for example, a given number of time intervals over a defined period of time intervals, such as every other superframe or 2 consecutive superframes in every 10 superframes, or the like.

According to an example, communications apparatus 200 can be utilized in a FDD MIMO system where a forward link broadcast signal can be transmitted by a base station and a reverse link by a mobile device. The communication apparatus 200 can be a base station or other access point that participates in a synchronous wireless communication network. The silence interval specifier 202 can define one or more silence intervals to be effectuated during wireless communication. The silence interval can be defined during an interval of time, according to an offset within the interval of time, and for a duration of time, all of which can be in units of OFDM symbols, frames (e.g., PHY frames), superframes, and the like. In a wireless communication configuration, for example, the bandwidth available can comprise a plurality of OFDM symbols each having one or more subcarriers for transmitting information. The OFDM symbols can relate to a symbol period and can be comprised within a frame or superframe that defines a unit of time in the communication. In one example, the available bandwidth can be divided into a set of subbands in a frequency domain, and a subband mask can be specified so that only a portion of the subbands are used for the silence interval. The silence interval can be specified during network planning, as a configuration parameter for example, during operation by an administrator or another device, and/or specified by the communications apparatus 200, such as when a thermal noise measurement is desired. It is to be appreciated that in one example, such as according to a base station, the thermal noise can remain somewhat constant such that it need not be measured frequently. Additionally or alternatively, the silence interval can be determined based on additional parameters, such as the thermal noise level, or an inconsistency thereof, a number of devices communicating with the communications apparatus 200, an interval of surrounding base stations, other devices on the communications network, or the underlying network, etc. Furthermore, in one example, the silence interval can be communicated to the communications apparatus 200 or another device using broadcast overhead messages, which can be transmitted periodically by one or more base stations to communicate configuration information, for example.

In an example, the transmitter 204 can broadcast the determined silence interval to one or more mobile devices, as part of a beacon message, for example, or another initial and/or configuration communication. In this regard, the mobile device can acquire the silence interval information during early communication with the base station to ensure compliance for effective thermal noise measurement.

According to another example, the communications apparatus 200 can be a mobile device or other access terminal that can define the silence interval via the silence interval specifier 202 in substantially the same manner as described and transmit the interval information one or more other devices or access points. Additionally, the communications apparatus 200 can receive transmitted silence interval information and employ the information to silence the transmitter 204 during the time period. For example, the received silence interval information can specify a silence interval defined by a period, such as one or more symbol periods or superframes, an offset, and duration as described above. The communications apparatus 200 can silence the transmitter during the defined period, at the offset, and for the duration. It is to be appreciated that the communications network can be synchronous to effectively facilitate silencing among the various devices or access terminals. In this regard, thermal noise detection can be facilitated in one or more communications apparatuses 200. The determined thermal noise level can be used by one or more power control algorithms to compute or control an IoT level. Further, other devices can use the silence interval to transmit high powered information, such as for public safety or terminals having very low signal. Moreover, the silence interval can be used for peer-to-peer (e.g., access terminal to access terminal communication).

Figure 3:
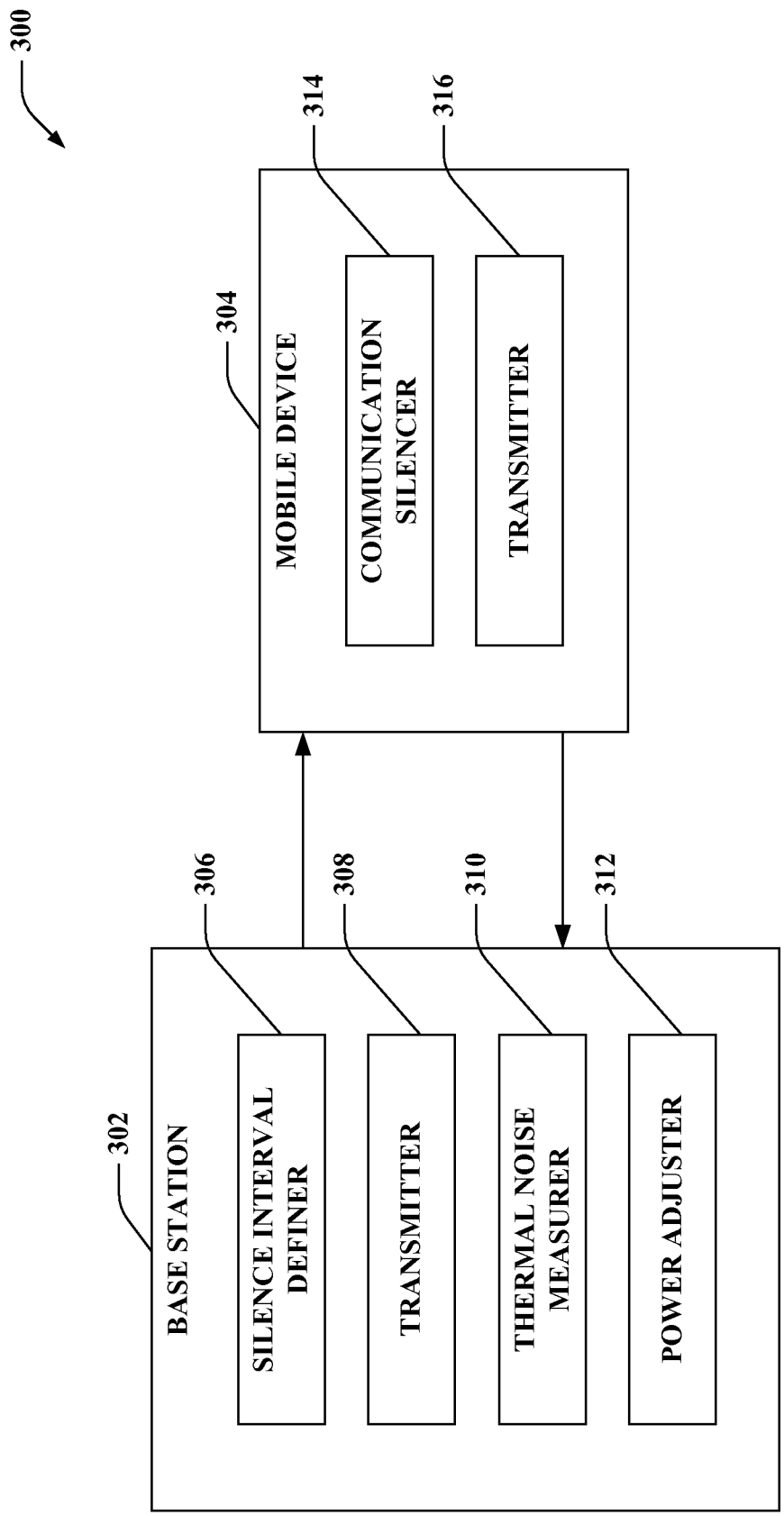
FIG. 3 is an illustration of an example wireless communications system that effectuates defining and utilizing silence intervals.

Now referring to FIG. 3, a wireless communications system 300 that effectuates defining and utilizing one or more silence intervals is illustrated. The wireless communications system 300 includes a base station 302 that communicates with a mobile device 304 (and/or any number of disparate mobile devices (not shown)). The base station 302 can transmit information to the mobile device 304 over a forward link channel, for example; further, the base station 302 can receive information from the mobile device 304 over a reverse link channel. Moreover, the wireless communications system 300 can be a MIMO system in one example, and can be a synchronous based system to facilitate time-synchronized events, for instance.

The base station 302 can include a silence interval definer 306 that can specify a silence interval based on an interval period, an offset, and duration as described, a transmitter 308 to communicate with or broadcast to one or more mobile devices 304, a thermal noise measurer 310 that can determine a level of thermal noise for the base station 302, and a power adjuster 312 that can adjust uplink power based at least in part on the measured thermal noise. The silence interval definer 306, in one example, can specify the silence interval to be used based in part on information received by the mobile device 304, in one example. The determined or specified silence interval information can be transmitted to one or more mobile devices 304 by the transmitter 308. This can be part of a beacon or other initial communication, in one example.

The mobile device 304 can comprise a communication silencer 314 that silences a transmitter 316 during the silence interval. In one example, as described, the silence interval can specify subbands to which it applies, which can be a portion of available transmission bandwidth and/or multiple contiguous time periods and frequency tones. In this case, the communication silencer 314 can silence the requisite subbands while allowing communication over the others from transmitter 316, for example. Moreover, the mobile device 304 can be synchronized with other mobile devices, other access terminals, base stations, other access points, and the like, to ensure the interval is effectively silenced. This can allow the thermal noise measurer 310 to effectively measure thermal noise as substantially no other devices are transmitting signals within the network or reachable transmission area. Using the thermal noise measurement, the power adjuster 312 can modify and/or verify an IoT parameter; this parameter can specify the level of interference to thermal noise to ensure maximal efficiency and output for the base station 302. As described, some amount of interference is desired to allow strong device communication, but too much interference can cause ambiguity in the network. Dynamically adjusting the IoT level based on a silence interval thermal noise measurement can achieve an appropriate balance.

Figure 4:
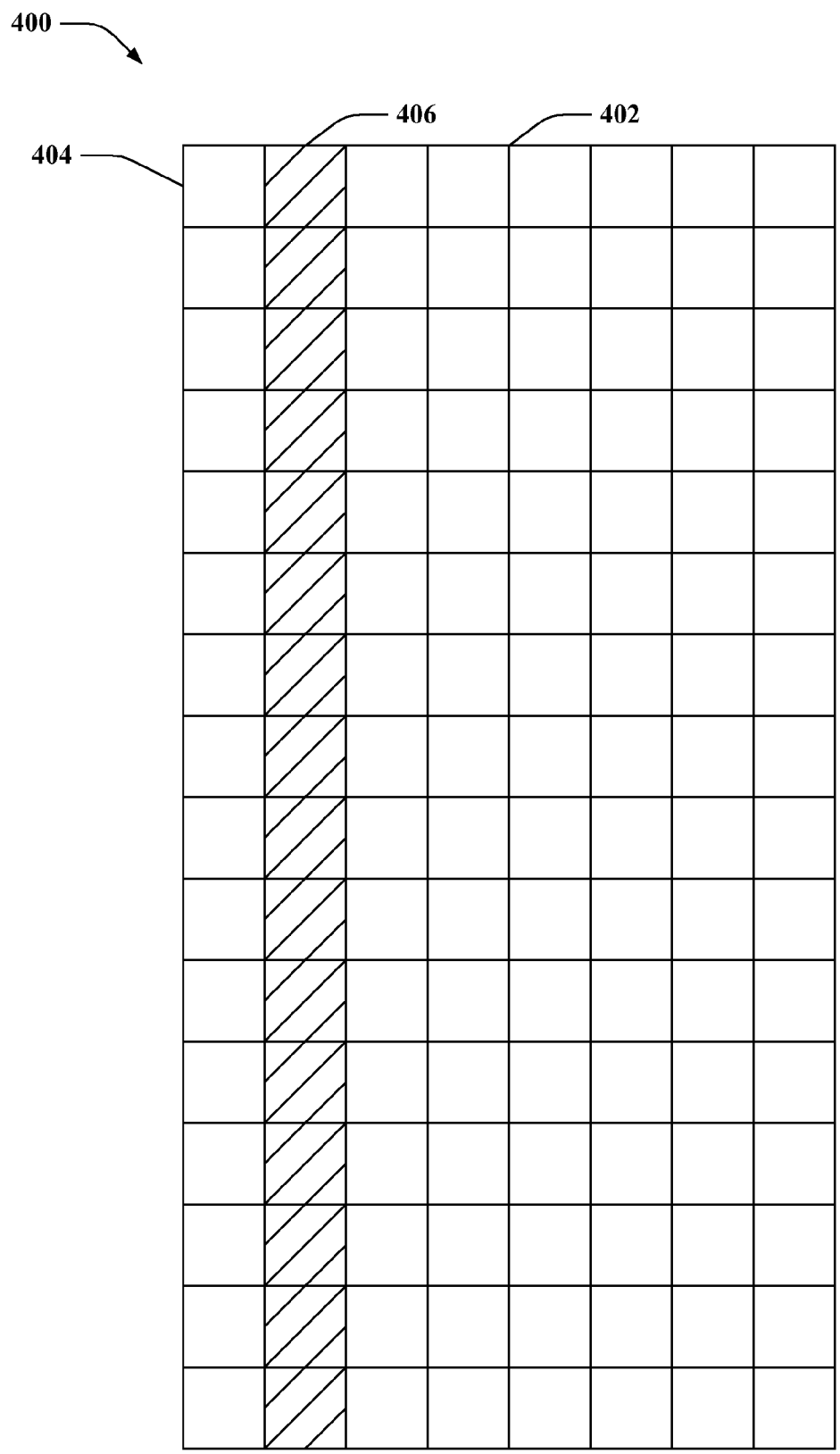
FIG. 4 is an illustration of example bandwidth that defines a silence interval.

Now referring to FIG. 4, an example broadcast message bandwidth 400 is shown. The bandwidth can be comprised in a superframe, for instance, which can also have a preamble (not shown). In one example, the bandwidth can represent a collection of subcarriers of a plurality of symbol periods. In this example, the slot 404 can refer to a single subcarrier of the first shown symbol period, and the silenced bandwidth 406 can refer to one or more contiguous subcarriers (or substantially all as shown) of the second symbol period that are silenced for the duration of the symbol period. It is to be appreciated that the silence interval can be defined for a portion subcarriers in a symbol period and can span one or more symbol periods. The silence interval is defined for an interval period of the superframe (or partial superframe) shown, at the offset of 406 (the second symbol period in this figure), and for the duration of a single symbol period (it could be multiple symbol periods as well). The users of the bandwidth 400 can cease communication during the silence interval for purposes shown above (e.g., thermal noise measurement, public safety communication, etc.). Moreover, more symbol periods and subcarriers can be defined for a superframe; shown here can be a subset to facilitate discussion.

In another example, the bandwidth 400 can refer to a PHY frame having a plurality of tiles over a subband. In this example, the silence interval 406 can be defined by a tile in the subband. In another example, though not shown, the silence interval can relate to a portion of the tile (e.g. a subset of the tones), one or more tiles or portions thereof, certain subbands, and the like. As shown, the subband can comprise 8 tiles, each of which comprises 16 tones, but can be more or less in other examples. In one example, the granularity for silence intervals can be an entire subband. In this regard, though not shown, the silence interval can be defined as the entire subband 402 where the subband is one of a plurality of subbands over a bandwidth. Moreover, the silence interval can be effectuated by increasing the number of guard carriers (e.g., zeroed-out carriers) in the OFDM symbols comprising the silence interval such that a portion of a previously useable number OFDM symbols now fall into the guard carrier portion and are automatically punctured (or zeroed-out), in one example.

As described, the devices or access terminals communicating in the network can receive the silence interval information from a base station or access point or be pre-coded with the information in one example. During the silence interval, the devices cease communication allowing base stations to measure thermal noise, other devices to communicate, such as out-of-range or nearly out-of-range devices, public safety devices, peer-to-peer communications, etc. In one example, during the PHY frames, the waveform is modified by blanking relevant subbands to effectuate the silence interval. The can happen regardless of CDMA control data or other data that might be assigned to the subband or subcarrier for a portion of the interval. In another example, the subbands can be blanked where reverse acknowledgement channel (R-ACKCH) data is to be sent; this can cause extra transmission for some forward data channel (F-DCH) packets, for example. Also, reverse data channel (R-DCH) data can be defined over the silence interval as well, but can be blanked out by the silence interval; this can be planned around, however. Though not limited to synchronous configurations, one way of planning around this can be to utilize a scheduler to ensure packets are not scheduled that overlap the silence interval. The silence interval functionality can be implemented, as described, in a synchronous environment to ensure effective silencing as the devices shutoff communications at the same time during the defined silence interval as well as in an asynchronous environment. Additionally, as mentioned, the silence interval can have a small duty cycle such that it can have a minimal effect on system performance.

Figure 5:
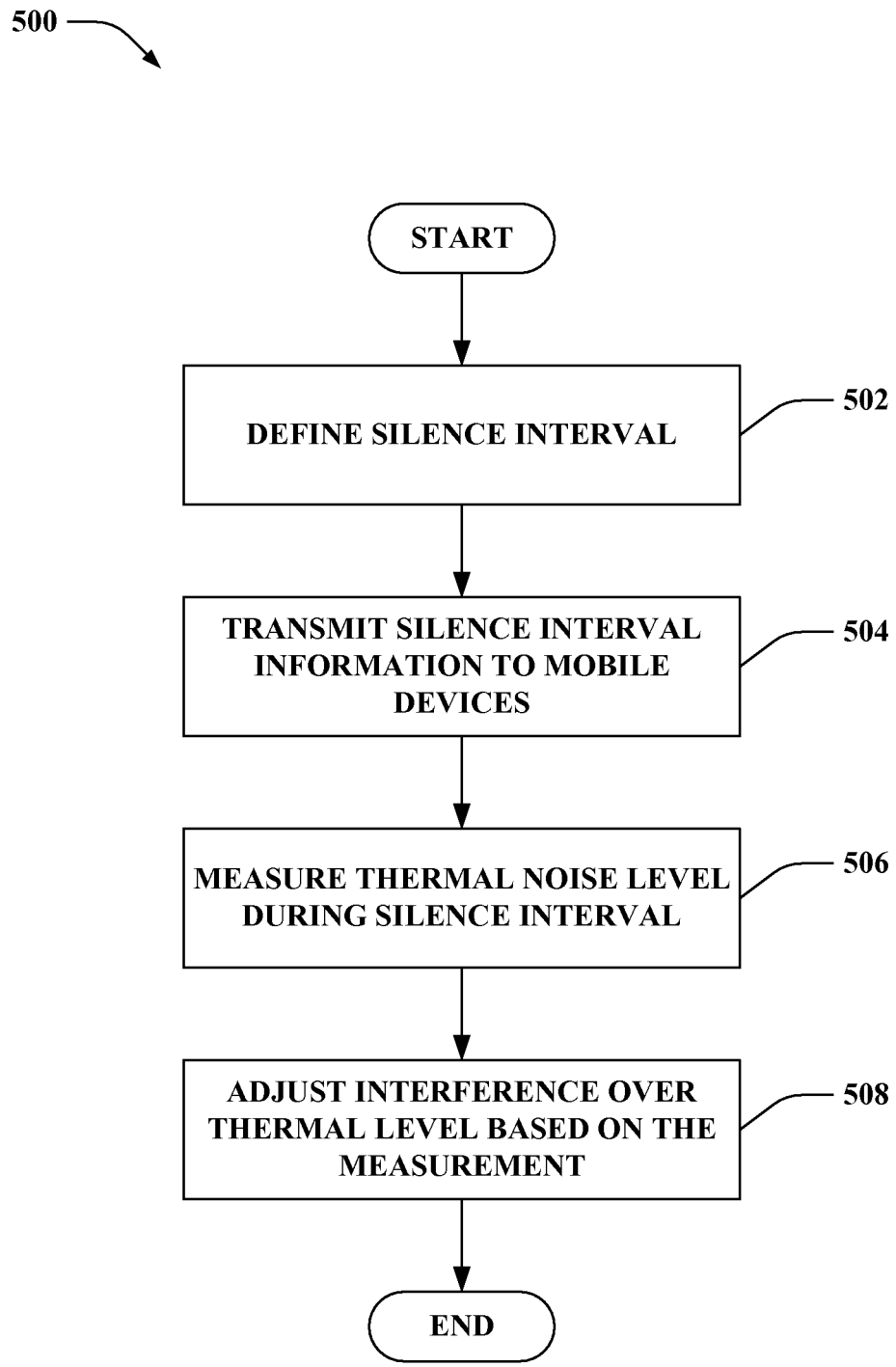
FIG. 5 is an illustration of an example methodology that facilitates defining and transmitting a silence interval.
Figure 6:
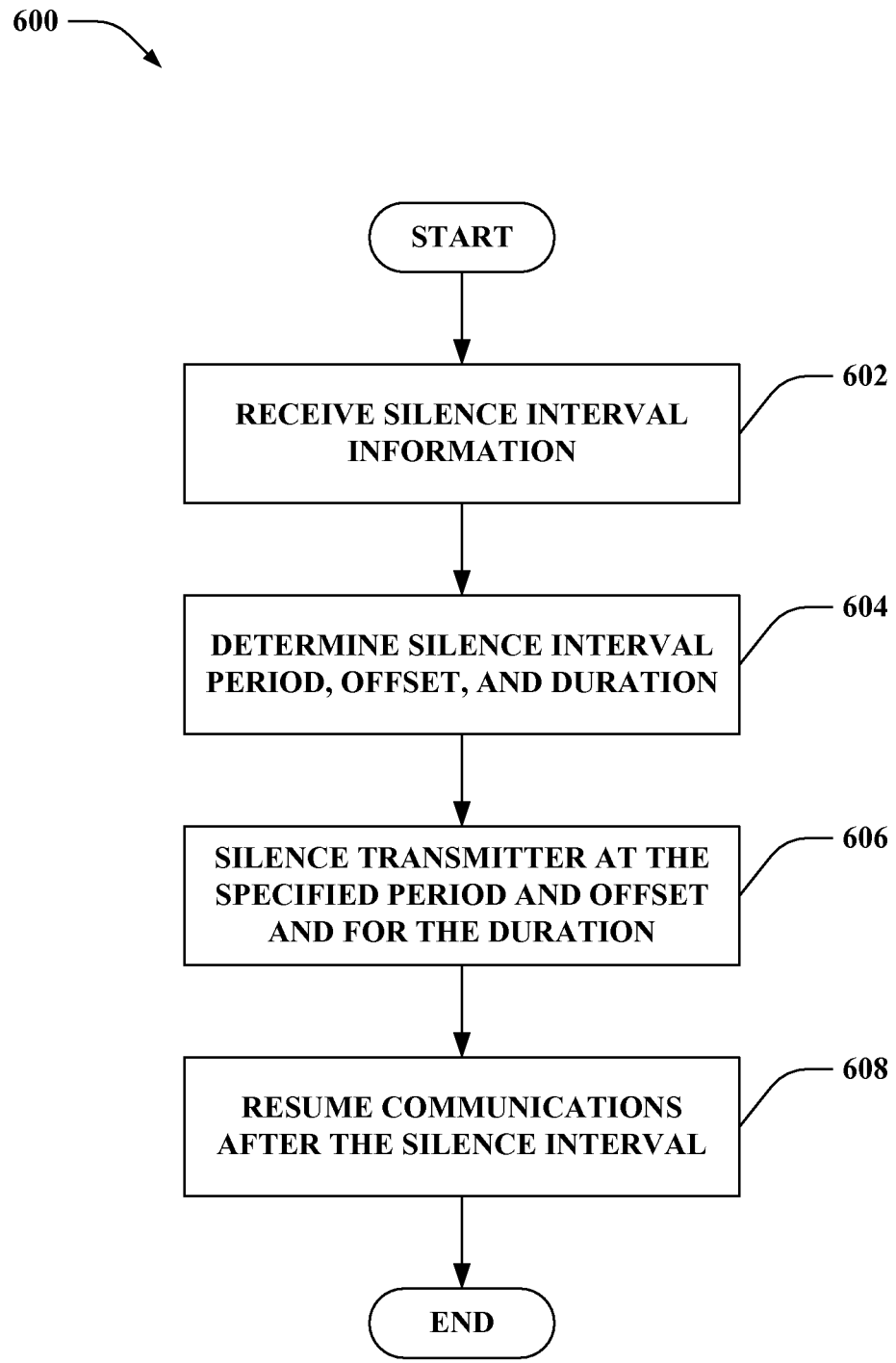
FIG. 6 is an illustration of an example methodology that facilitates receiving and implementing a silence interval.

Referring to FIGS. 5-6, methodologies relating to defining and utilizing silence intervals in MIMO systems are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Now referring to FIG. 5, a methodology 500 that facilitates measuring thermal noise during a silence interval is illustrated. At 502, a silence interval can be defined according to the examples provided above. For instance, the silence interval can define a period, such as one or more superframes, an offset within a superframe, and a duration for the silence. This can be determined based on a number of factors including network planning, real-time configuration, a number and/or power of transmitting devices, information from other devices or network components, and/or the like. At 504, the silence interval information can be transmitted to one or more mobile devices. This can be transmitted upon establishing communications, as a beacon message, and/or the like; the mobile devices can cease communications during the silence interval according to the information received.

At 506, a thermal noise level can be measured during the silence interval. For example, as the mobile devices have ceased communication, an uplink can be measured for thermal noise without interference from other devices. Using this measurement, an IoT level can be adjusted at 508. As described, communication in a wireless network can be measured as interference to thermal noise such that some level of interference is desired/required for effective communication from the devices; however, too much interference can make communication less effective and efficient. Thus, the IoT level can represent an optimal level of interference to thermal noise and can be adjusted according to the measurement at a periodic basis to ensure optimal or desirable communication performance.

With reference to FIG. 6, a methodology 600 that facilitates receiving and utilizing silence interval information is displayed. At 602, silence interval information is received. As mentioned, this can be received from memory as pre-coded information or received from other devices such as base stations or other access points, for example. At 604, the silence interval is determined as an interval period, offset, and duration. The interval period can be defined, for example, as one or more superframes and/or a series of superframes (e.g., every n-th superframe). The offset can be one or more tiles or symbol periods into the superframe at which the silence interval is to begin, and the duration can be one or more symbol periods or tiles in the superframe.

At 606, the transmitter of a device is silenced at the period and offset and for the duration specified. For example, regardless of a communication specified for the transmitter (e.g., an R-ACKCH, R-DCH, or other CDMA control/data), the relevant subbands and/or subcarriers are blanked to effectuate the silence. During this silence, base stations can measure thermal levels, other networks or devices can communicate, such as in a public safety or peer-to-peer configuration, for example, and the like. At 608, the communications can be resumed following the silence interval. In one example, where communication was cancelled or blanked out during the silence interval, such as R-ACKCH, the communication can be resent or the device can wait for more F-DCH data, for example.

It will be appreciated that, in accordance with one or more aspects described herein, inferences can be made regarding defining a silence interval; for example, silence metrics of other access points or devices or other information related thereto, such as number of devices or average/total transmission power, can be acquired and evaluated to infer one or more of the silence interval metrics. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic— that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to defining a silence interval. By way of further illustration, an inference can be made based in part on a number of devices transmitting in an area; this metric can change for a given area and/or a time of day. For example, early morning hours can show substantially less data traffic than late afternoon hours. Accordingly, the silence interval for afternoon hours can be inferred as occurring more frequently for less duration to ensure that the IoT level is optimally set for given conditions, but the system is interrupted for a short period of time. It is to be appreciated that the foregoing examples are illustrative in nature and are not intended to limit the number of inferences that can be made or the manner in which such inferences are made in conjunction with the various embodiments and/or methods described herein.

Figure 7:
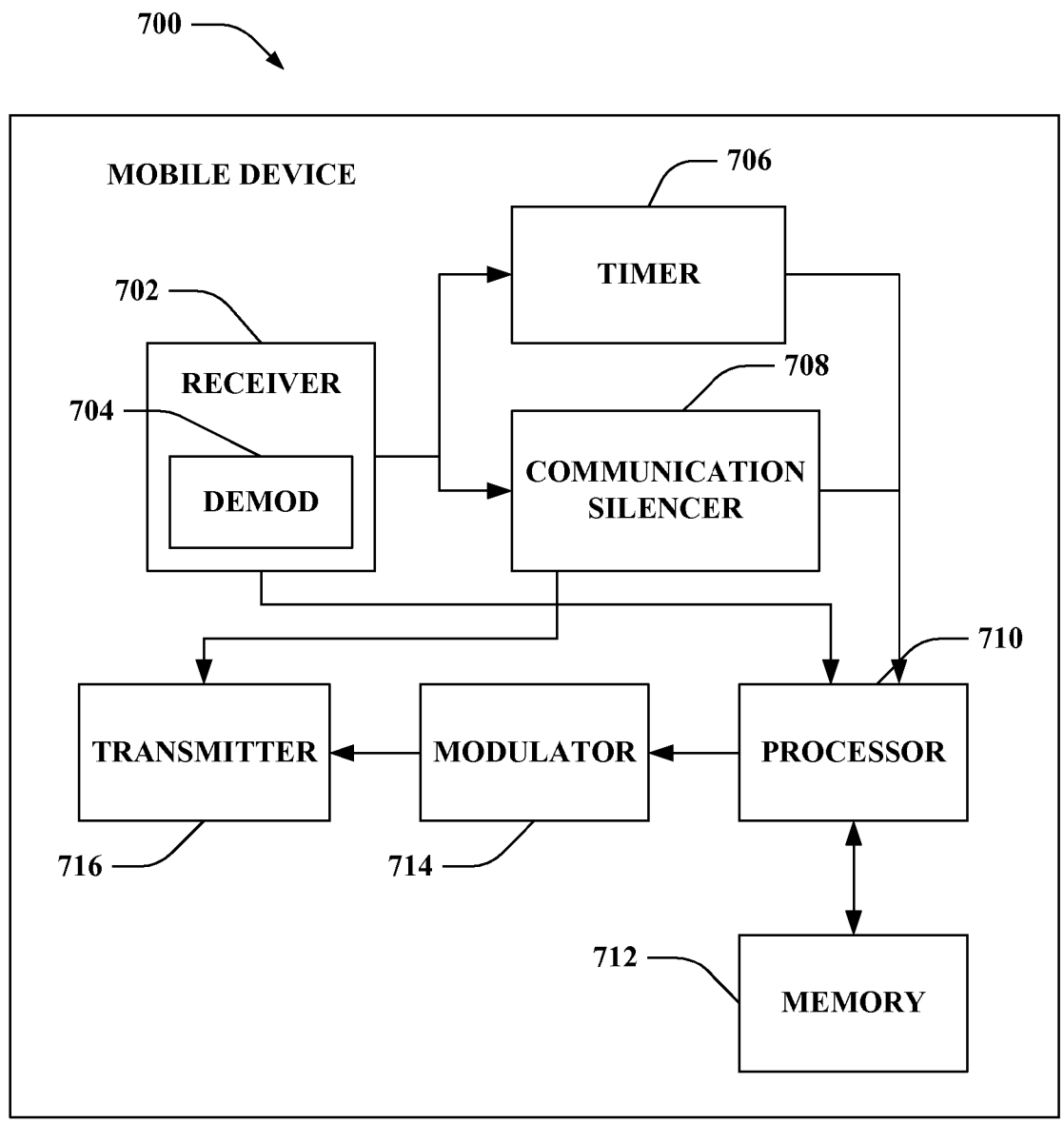
FIG. 7 is an illustration of an example mobile device that facilitates silencing communication during a silence interval.

FIG. 7 is an illustration of a mobile device 700 that facilitates receiving and utilizing silence interval information in a MIMO system, for example. Mobile device 700 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can receive information regarding silence interval data as described previously. Additionally, the mobile device 700 can comprise a demodulator 704 that can demodulate received information, such as the silence interval information, and provide them to a processor 710, a timer 706 for facilitating synchronous communication and/or a communication silencer 708 that silences communication during specified intervals, for example. Processor 710 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 712 that is operatively coupled to processor 710 and that can store data to be transmitted, received data, information related to available channels, data associated with analyzed signal and/or interference strength, information related to an assigned channel, power, rate, or the like, and any other suitable information for estimating a channel and communicating via the channel. Memory 712 can additionally store protocols and/or algorithms associated with estimating and/or utilizing a channel (e.g., performance based, capacity based, etc.). Moreover, the memory 712 can store information related to a silence interval as described, such as an interval period, offset, and/or duration for effectuating the desired silence.

It will be appreciated that the data store (e.g., memory 712) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 712 of the subject systems and methods is intended to comprise, without being limited to, these and any other suitable types of memory.

According to an example, the receiver 702 can receive silence interval information including an interval period, offset, and duration as described. The information can be demodulated by the demod 704 and sent to the communication silencer 708 (directly or via the processor 710, for example). The communication silencer 708 can use the information to define the silence interval for the mobile device 700. In this regard, the communication silencer 708 can leverage the timer 706 to detect the occurrence of the interval period superframe and the determined offset within the superframe. Upon reaching the offset, the communication silencer 708 can block communication from the transmitter 716 (directly or via the processor 710, for example) for the duration of the silence interval according to the timer 706. Thus, communication can be silenced for the defined period.

According to another example, the mobile device 700 can initiate peer-to-peer communication during the silence interval. For example, the mobile device 700 can obtain silence interval information as described above and use the silence interval duration, specified by the timer 706, to transmit peer-to-peer communication via the transmitter 716. In another example, the mobile device 700 can utilize the silence interval to transmit high-powered signals where the device is out-of-range and/or in an emergency communication mode, for example. Although depicted as being separate from the processor 710, it is to be appreciated that timer 706, communications silencer 708 and/or modulator 714 can be part of processor 710 or a number of processors (not shown).

Figure 8:
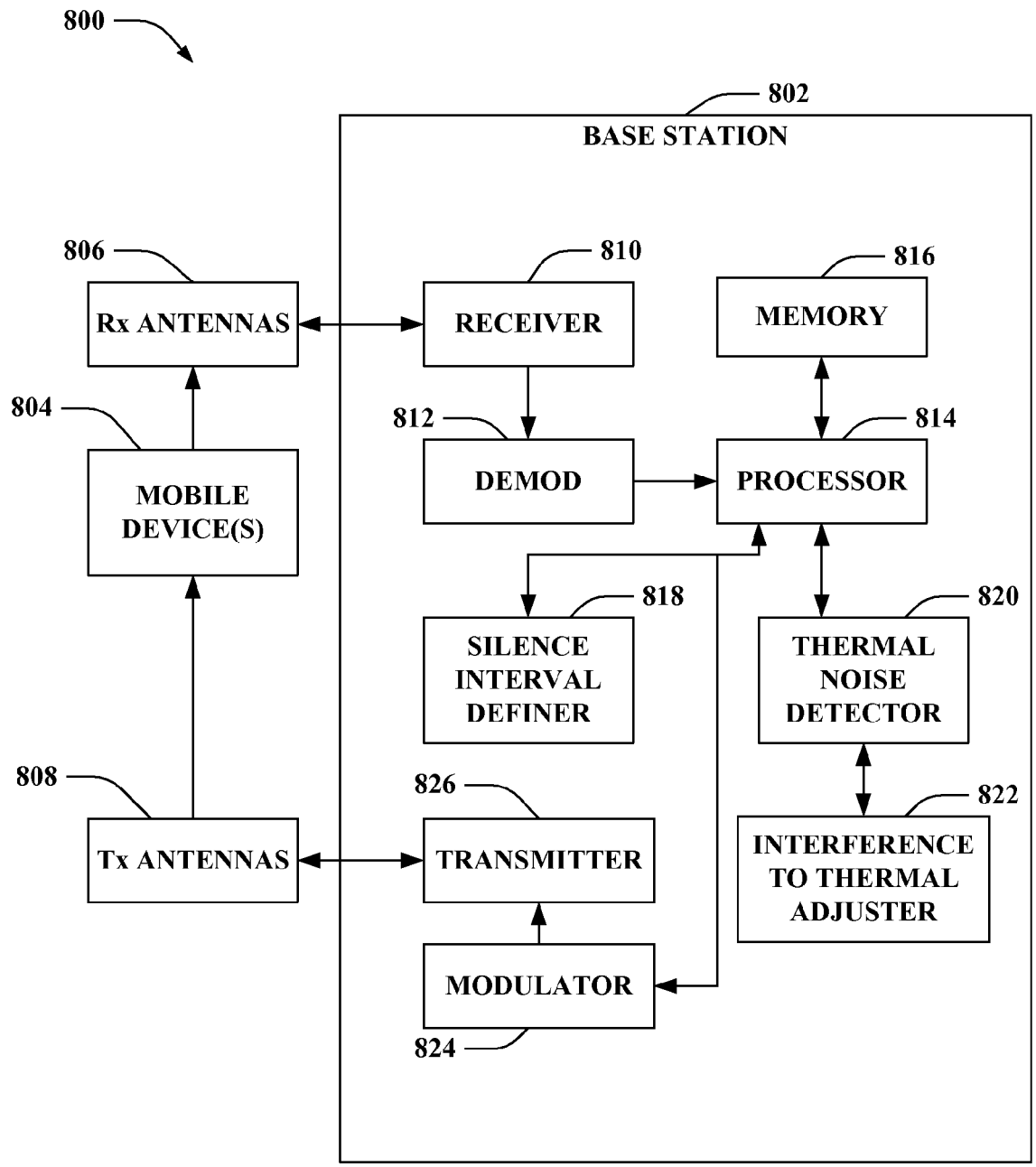
FIG. 8 is an illustration of an example system that facilitates defining a silence interval and setting an interference over thermal (IoT) level.

FIG. 8 is an illustration of a system 800 that facilitates defining a silence interval and measuring a thermal noise level during the silence in a MIMO environment, for example. System 800 comprises a base station 802 (e.g., access point, . . . ) with a receiver 810 that receives signal(s) from one or more mobile devices 804 through a plurality of receive antennas 806, and a transmitter 826 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a silence interval definer 818 that can determine a silence interval and send information regarding the silence interval to mobile devices 804, such as by utilizing the transmitter 826 and Tx antennas 808, for example. This can be sent as part of a beacon message or other communication.

According to an example, the silence interval definer 818 can create a silence interval in communication based on various factors as described above. The silence interval can be defined for an interval period, such as a superframe or period of such. Additionally, the silence interval can have an associated offset within the superframe and a duration. In one example, the silence interval can also define a number of subbands to blank out during the silence interval. The silence interval can be defined according to a synchronous system or network as well allowing the silence to occur at the same time with respect to silencing devices. It is to be appreciated that the silence intervals can be defined based in part on the usage thereof, for example, where the silence interval is utilized for thermal noise measurement, the silence interval need not occur very often as thermal noise level can be somewhat static. Additionally, however, if the silence interval is used for other devices, such as public safety or peer-to-peer communication, a larger interval (or more frequent intervals) can be desired. This information can be inferred or set according to static or dynamic factors, as described.

According to one example, the silence interval information can be sent to mobile devices 804, and/or pre-coded within the device, such that a defined interval within a period, defined by an offset, can be silent (e.g., mobile devices 804 cease communications) for a duration. During the silence, a thermal noise detector 820 can measure the thermal noise of an uplink of the base station 802, for example. According to an example. An interference to thermal adjuster 822 can adjust a power level, or an IoT level, based on the measurement of thermal noise. In this regard, the base station 802 can achieve an optimal level of interference to thermal level by utilizing the silence intervals to measure the thermal noise, thereby facilitating efficient communication.

Figure 9:
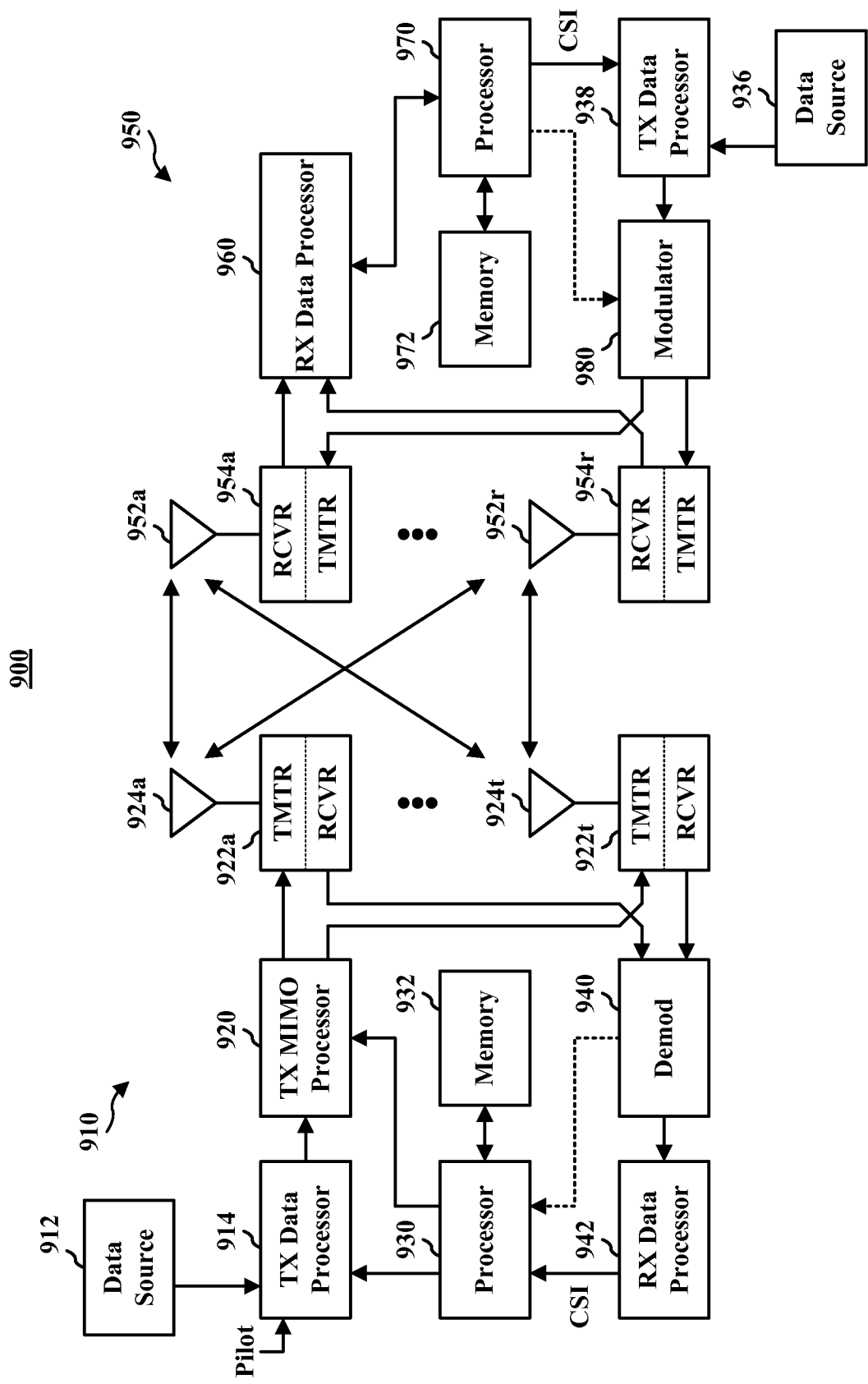
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g. symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g. amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g. control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
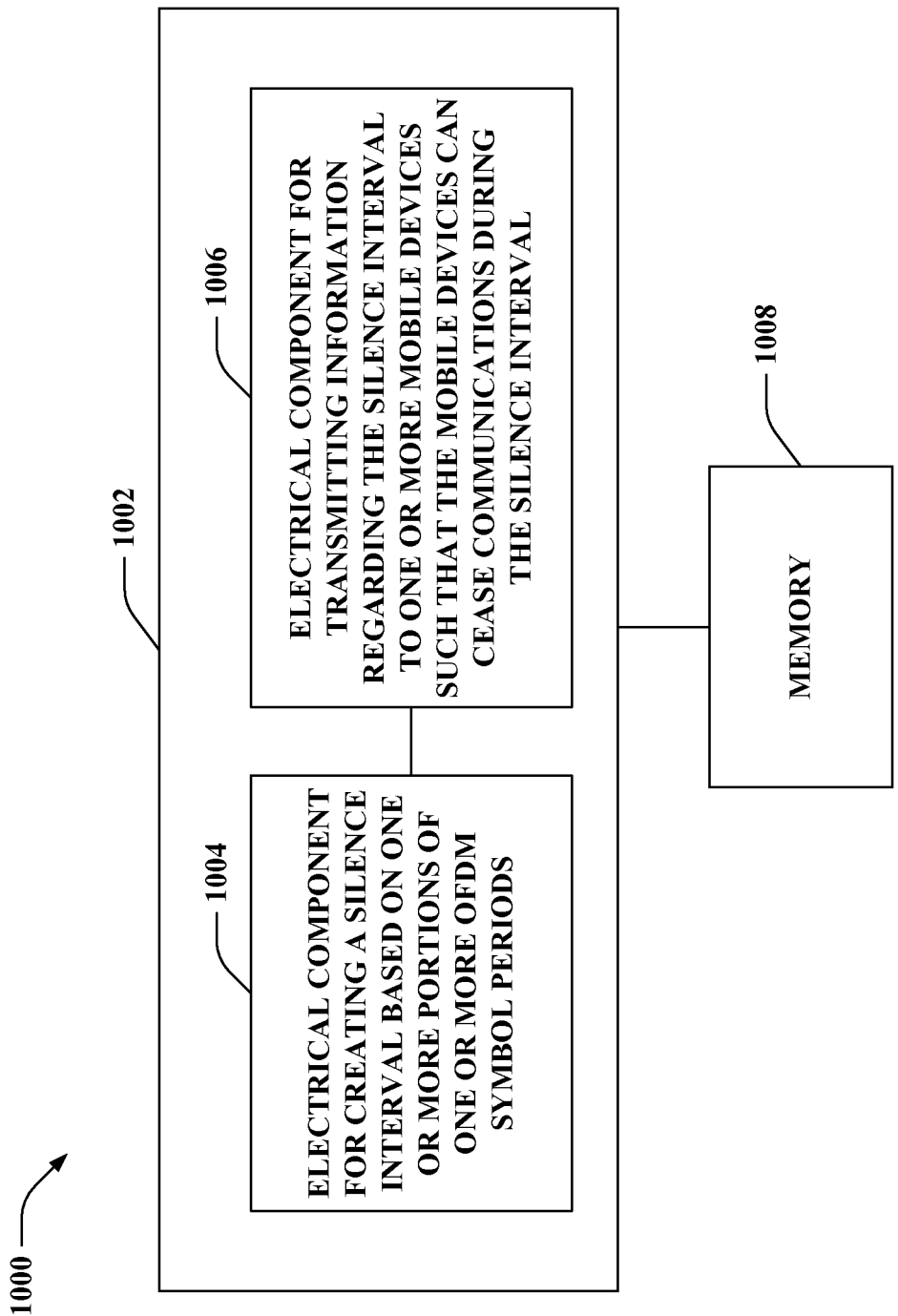
FIG. 10 is an illustration of an example system that measures thermal noise during a defined silence interval.

With reference to FIG. 10, a system 1000 that determines a silence interval and utilizes the silence interval to measure thermal noise is illustrated. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for creating a silence interval based on one or more portions of one or more OFDM symbol periods 1004. For example, the silence interval can be defined for a given time period, or number of symbol periods, within an OFDM superframe. The silence interval metrics can be determined based on various static or dynamic variables as described in reference to previous figures, including inference technologies, network planning, information received regarding mobile devices or other base stations, network information, and/or the like. Further, logical grouping 1002 can comprise an electrical component for transmitting information regarding the silence interval to one or more mobile devices such that the mobile devices can cease communications during the silence interval 1006. For example, the mobile devices, upon acquiring the information, can implement the silence interval to ensure communication during the interval ceases. It is to be appreciated that the wireless communications network can be synchronous in this regard, such that the silence can occur over substantially the same period by substantially all the devices that receive the silence interval information. Additionally, system 1000 can include a memory 1008 that retains instructions for executing functions associated with electrical components 1004, and 1006. While shown as being external to memory 1008, it is to be understood that one or more of electrical components 1004 and 1006 can exist within memory 1008.

Figure 11:
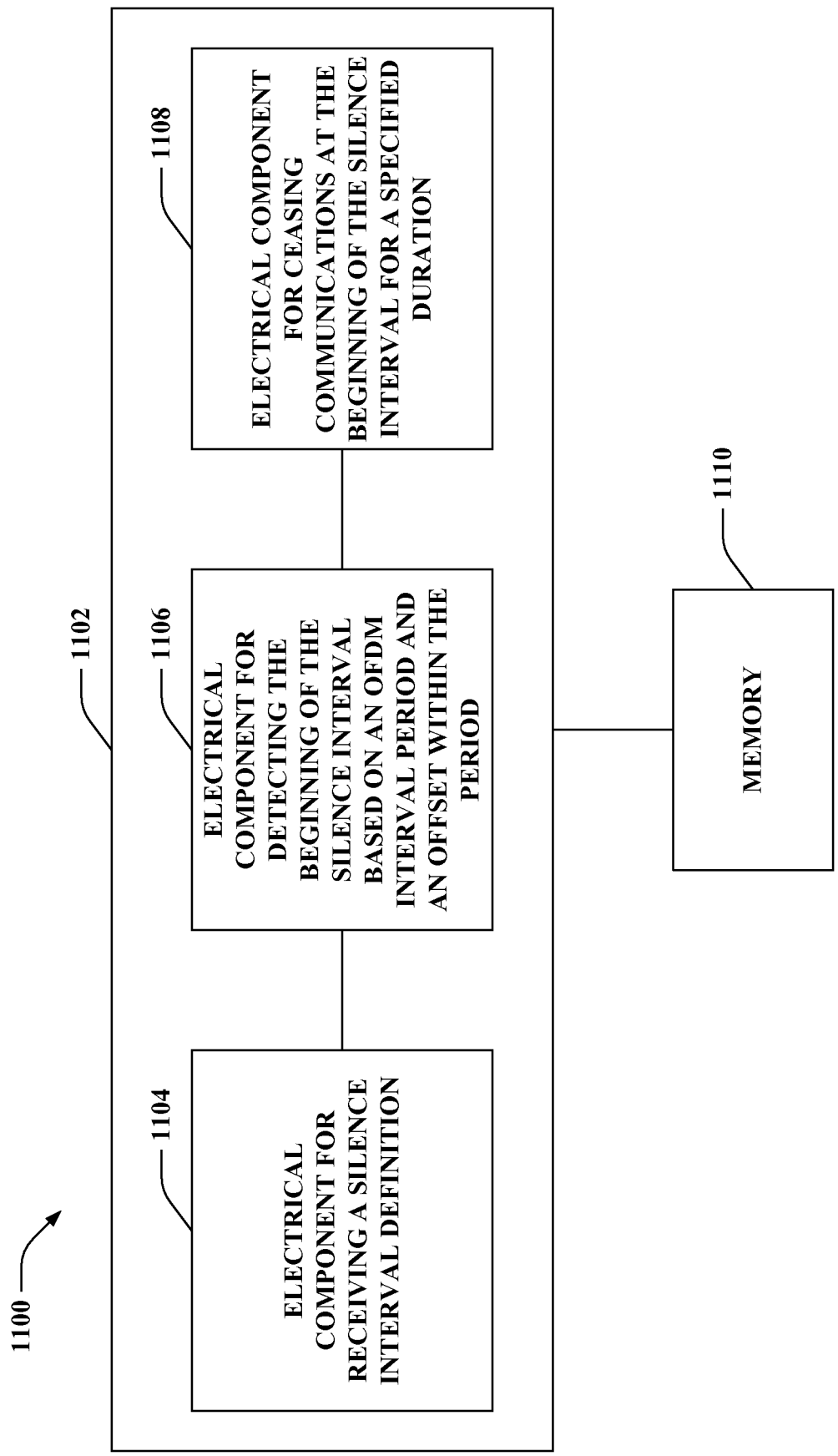
FIG. 11 is an illustration of an example system that ceases communications during a silence interval.

Turning to FIG. 11, a system 1100 is displayed that facilitates receiving and implementing a silence interval for terminating communications. System 1100 can reside at least partially within a mobile device, for instance. As depicted, system 1100 includes functional blocks that can represent functions implemented by a processor, software, or combination thereof (e.g. firmware). System 1100 includes a logical grouping 1102 of electrical components that facilitate controlling reverse link transmission. Logical grouping 1102 can include an electrical component for receiving a silence interval definition 1104. For example, the silence interval definition can comprise an interval period, an offset within the period for beginning the silence, and a duration. Implementation of this interval can allow base stations to measure thermal noise, allow public safety device communication, provide for peer-to-peer device communication, and/or the like. Moreover, logical grouping 1102 can include an electrical component for detecting the beginning of the silence interval based on an OFDM interval period and an offset within the period 1106. In this regard, the communications within the wireless communications network can be synchronous to facilitate effective silencing of substantially all participating devices beginning at the specified offset within the specified interval period (which can be a superframe in one example). Further, logical grouping 1102 can comprise an electrical component for ceasing communications at the beginning of the silence interval for a specified duration 1108. In this way, interference from participating devices can be nullified for the duration of the silence interval allowing base stations to measure thermal noise, devices to communicate peer-to-peer, public safety devices to communicate, and/or the like. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method in a wireless communications network, comprising:
   determining a silence interval based on one or more variable parameters of the communications network and comprising one or more OFDM symbol periods during which one or more transmitting devices can cease transmission on one or more subcarriers comprising the OFDM symbol based at least in part on information transmitted from a base station prior to the silence interval, the base station being an access point for one or more mobile devices; and
   performing a task during the silence interval.
2. The method of claim 1, the task performed is measuring the uplink thermal noise during the silence interval.
3. The method of claim 1, further comprising transmitting one or more of an interval period, an offset within the interval period, and/or a duration of the silence interval to the one or more mobile devices.
4. The method of claim 3, the interval period, offset within the period, and/or duration are transmitted as part of a broadcast message.

5. The method of claim 1, further comprising selecting a subset of subbands for blanking out as part of the silence interval.

6. The method of claim 1, the task performed is receiving public safety or long-range communication during the silence interval.

7. The method of claim 1, peer-to-peer device communication is facilitated during the silence interval.

8. The method of claim 1, the silence interval is defined by increasing a number of guard carriers of the one or more OFDM symbol periods.

9. A wireless communications apparatus, comprising:
at least one processor configured to define a silence interval based on one or more variable parameters of a communications network and as a portion of one or more OFDM symbol periods of transmission bandwidth such that one or more transmitting devices cease transmission during the silence interval, the silence interval based at least in part on information transmitted from a base station prior to the silence interval, the base station being an access point for one or more mobile devices; and
a memory coupled to the at least one processor.

10. The wireless communications apparatus of claim 9, the silence interval is defined by one or more of a superframe interval period, an offset within the superframe, and/or a duration.

11. The wireless communications apparatus of claim 10, the silence interval is further defined by a portion of subbands on which to cease transmission.

12. The wireless communications apparatus of claim 11, the at least one processor further configured to broadcast a beacon signal, the silence interval definition transmitted as a portion of the beacon signal.

13. The wireless communications apparatus of claim 9, the at least one processor further configured to adjust an interference over thermal (IoT) metric to facilitate operating with an optimal amount of interference from the one or more mobile devices.

14. The wireless communications apparatus of claim 13, the at least one processor further configured to measure thermal noise of an uplink during the defined silence interval and adjust the IoT metric based at least in part on the thermal noise.

15. The wireless communications apparatus of claim 9, the at least one processor further configured to receive one or more public safety communication during the silence interval.

16. A wireless communications apparatus that facilitates defining one or more silence intervals, comprising:
means for creating a silence interval based on one or more variable parameters of a communications network and one or more portions of one or more OFDM symbol periods; and
means for transmitting information from a base station in a transmitted message regarding the silence interval to one or more mobile devices prior to the silence interval such that the mobile devices can cease communications during the silence interval based on the information in the transmitted message, the base station being an access point for the one or more mobile devices.

17. The wireless communications apparatus of claim 16, the silence interval is defined by one or more of an interval of an OFDM symbol period, an offset within the period, and/or a duration.

18. The wireless communications apparatus of claim 16, further comprising means for measuring a thermal noise level of an uplink during the silence interval.

19. The wireless communications apparatus of claim 18, further comprising means for adjusting an interference over thermal (IoT) level based at least in part on the thermal noise.

20. The wireless communications apparatus of claim 16, further comprising means for receiving high-powered public safety or out-of-range communication during the silence interval.

21. The wireless communications apparatus of claim 16, the information regarding the silence interval is transmitted to the one or more mobile devices as part of a beacon signal.

22. The wireless communications apparatus of claim 16, peer-to-peer communication is facilitated during the silence interval.

23. A non-transitory computer-readable medium including computer-executable code stored thereon, comprising:
code for causing at least one computer to determine a silence interval based on one or more variable parameters of a communications network and comprising one or more OFDM symbol periods during which one or more transmitting devices can cease communications, the silence interval based at least in part on information transmitted from a base station prior to the silence interval, the base station being an access point for one or more mobile devices; and
code for causing the at least one computer to perform a task during the silence interval.

24. The non-transitory computer-readable medium of claim 23, the silence interval is defined by one or more of the one or more OFDM symbol periods, an offset within the one or more OFDM symbol periods, and/or a duration, and the task performed is measuring a thermal noise level of a transmitter.

25. In a wireless communication system, an apparatus comprising:
a processor configured to:
create a silence interval based on one or more variable parameters of a communications network and one or more portions of one or more OFDM symbol periods; and
transmit information from a base station in a transmitted message regarding the silence interval to one or more mobile devices prior to the silence interval such that the mobile devices can cease communications during the silence interval based on the information in the transmitted message, the base station being an access point for the one or more mobile devices; and
a memory coupled to the processor.

26. A method that facilitates silencing communications during a silence interval, comprising:
obtaining silence interval metrics based on one or more variable parameters of a communications network and related to one or more portions of one or more OFDM symbol periods in one of information transmitted from a base station prior to the silence interval, the base station being an access point for one or more mobile devices; and
silencing transmission during the silence interval.

27. The method of claim 26, the silence interval is defined by one or more of an interval of an OFDM interval symbol period of a superframe, an offset within the superframe for beginning the silence interval, and a duration for the silence interval.

28. The method of claim 26, the silencing transmission comprising blanking out relevant subbands of one or more physical (PHY) transmission frames that are a part of the silence interval defined by the OFDM interval symbol period, the subbands define at least on control or data channel.

29. The method of claim 28, the relevant subbands comprise substantially all available subbands for transmission.

30. The method of claim 26, the silencing transmission facilitates thermal noise measuring of the base station.

31. The method of claim 26, further comprising peer-to-peer communicating with a mobile device during the silence interval.

32. The method of claim 26, further comprising transmitting with high-power to communicate with an otherwise out-of-range wireless communication device during the silence interval to convey emergency information.

33. The method of claim 26, the silence interval metrics are obtained from a base station desiring occurrence of the silence interval.

34. The method of claim 33, the silence interval metrics are received from the base station via a beacon signal.

35. A wireless communications apparatus, comprising:
at least one processor configured to receive a silence interval definition based on one or more variable parameters of a communications network and at least in part on information transmitted from a base station prior to a silence interval, the silence interval definition comprising an OFDM interval period for silence and to silence communications during the silence interval, the base station being an access point for one or more mobile devices; and
a memory coupled to the at least one processor.

36. The wireless communications apparatus of claim 35, the silence interval definition comprises an OFDM superframe, an offset within the superframe, and a duration.

37. The wireless communications apparatus of claim 36, the silence interval definition further comprises a portion of subbands to be silenced during the silence interval.

38. The wireless communications apparatus of claim 35, the silence interval definition is received from the base station desiring to measure thermal noise during the silence interval.

39. The wireless communications apparatus of claim 35, the at least one processor is further configured to communicate peer-to-peer with another wireless communications apparatus during the silence interval.

40. The wireless communications apparatus of claim 35, the at least one processor is further configured to transmit a high-powered emergency signal during the silence interval.

41. The wireless communications apparatus of claim 35, the silence interval definition is received from the base station desiring occurrence of the silence.

42. A wireless communications apparatus for effectuating silence during a silence interval, comprising:
means for receiving a silence interval definition based on one or more variable parameters of a communications network and at least in part on information transmitted from a base station prior to the silence interval, the base station being an access point for one or more mobile devices;
means for detecting the beginning of the silence interval based on an OFDM interval period and an offset within the period; and
means for ceasing communications at the beginning of the silence interval for a specified duration.

43. The wireless communications apparatus of claim 42, further comprising means for silencing one or more subbands as further specified by the silence interval definition, the subbands relate to a control or data channel.

44. The wireless communications apparatus of claim 42, the ceasing communications facilitates thermal noise measuring of the base station.

45. The wireless communications apparatus of claim 44, the base station transmits the silence interval definition to the wireless communications apparatus.

46. The wireless communications apparatus of claim 42, further comprising peer-to-peer communicating with a mobile device during the silence interval.

47. The wireless communications apparatus of claim 42, further comprising transmitting with high-power to communicate with an otherwise out-of-range wireless communication device during the silence interval to convey emergency information.

48. A non-transitory computer-readable medium including computer-executable code stored thereon, comprising:
code for causing at least one computer to obtain silence interval metrics based on one or more variable parameters of a communications network and related to one or more portions of one or more OFDM symbol periods in one of information transmitted from a base station prior to a silence interval, the base station being an access point for one or more mobile devices; and
code for causing the at least one computer to silence transmission during the silence interval.

49. The non-transitory computer-readable medium of claim 48, the silence interval is defined by an OFDM interval symbol period of a superframe, an offset within the superframe for beginning the silence interval, and a duration for the silence interval.

50. In a wireless communication system, an apparatus comprising:
a processor configured to:
receive a silence interval definition based on one or more variable parameters of a communications network and at least in part on information transmitted from a base station prior to a silence interval, the base station being an access point for one or more mobile devices;
detect the beginning of the silence interval based on an OFDM interval period and an offset within the period; and
cease communications at the beginning of the silence interval for a specified duration; and
a memory coupled to the processor.

* * * * *